(12) United States Patent
Kimes

(10) Patent No.: US 8,079,453 B2
(45) Date of Patent: Dec. 20, 2011

(54) CONTROLLABLE OVERRUNNING COUPLING ASSEMBLY

(75) Inventor: John W. Kimes, Wayne, MI (US)

(73) Assignee: Means Industries, Inc., Saginaw, MI (US)

( * ) Notice: Subject to any disclaimer, the term of this patent is extended or adjusted under 35 U.S.C. 154(b) by 519 days.

(21) Appl. No.: 12/353,575

(22) Filed: Jan. 14, 2009

(65) Prior Publication Data

US 2009/0211863 A1 Aug. 27, 2009

Related U.S. Application Data

(60) Provisional application No. 61/066,620, filed on Feb. 21, 2008.

(51) Int. Cl.
*F16D 41/16* (2006.01)
(52) U.S. Cl. .............. 192/43.1; 192/46; 192/47; 192/65
(58) Field of Classification Search .............. 192/43.1, 192/65
See application file for complete search history.

(56) References Cited

U.S. PATENT DOCUMENTS

| | | | |
|---|---|---|---|
| 5,871,071 A | 2/1999 | Sink | |
| 5,918,715 A | 7/1999 | Ruth et al. | |
| 5,927,455 A | 7/1999 | Baker et al. | |
| 5,937,980 A * | 8/1999 | Dick | 192/43.1 |
| 5,964,331 A | 10/1999 | Reed et al. | |
| 6,065,576 A | 5/2000 | Shaw et al. | |
| 6,116,394 A | 9/2000 | Ruth | |
| 6,125,980 A | 10/2000 | Ruth et al. | |
| 6,129,190 A | 10/2000 | Reed et al. | |
| 6,186,299 B1 | 2/2001 | Ruth | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,333,112 B1 | 12/2001 | Field et al. | |
| 6,386,349 B1 | 5/2002 | Welch | |
| 6,481,551 B1 | 11/2002 | Ruth | |
| 6,505,721 B1 | 1/2003 | Welch | |
| 6,571,926 B2 | 6/2003 | Pawley | |
| RE38,498 E | 4/2004 | Ruth et al. | |
| 6,814,201 B2 * | 11/2004 | Thomas | 192/43.1 |
| 6,854,577 B2 | 2/2005 | Ruth | |
| 7,100,756 B2 | 9/2006 | Kimes et al. | |
| 7,223,198 B2 | 5/2007 | Kimes et al. | |
| 7,258,214 B2 | 8/2007 | Pawley et al. | |
| 7,296,668 B2 | 11/2007 | Fetting, Jr. et al. | |
| 7,344,010 B2 | 3/2008 | Fetting, Jr. et al. | |
| 7,383,930 B2 | 6/2008 | Kimes et al. | |
| 7,448,481 B2 | 11/2008 | Kimes et al. | |
| 7,451,862 B2 | 11/2008 | Kimes et al. | |
| 7,455,156 B2 | 11/2008 | Kimes et al. | |
| 7,455,157 B2 | 11/2008 | Kimes et al. | |
| 2005/0279602 A1 | 12/2005 | Ruth | |
| 2006/0021838 A1 | 2/2006 | Kimes et al. | |
| 2006/0185957 A1 | 8/2006 | Kimes et al. | |

(Continued)

*Primary Examiner* — Richard M. Lorence
(74) *Attorney, Agent, or Firm* — Brooks Kushman P.C.

(57) ABSTRACT

A controllable overrunning coupling assembly includes a control member mounted for controlled shifting movement between a first pair of coupling faces of first and second coupling members relative to reverse pockets formed in one of the coupling faces. The first pair of coupling faces oppose each other and are oriented to face axially along a common rotational axis. The control member is operable for controlling position of only reverse struts in the reverse pockets without controlling the position of forward rockers in forward pockets formed in a coupling face of a second pair of coupling faces of the coupling members that oppose each other and are oriented to face radially with respect to the rotational axis.

10 Claims, 6 Drawing Sheets

U.S. PATENT DOCUMENTS

2006/0278487 A1 12/2006 Pawley et al.
2007/0056825 A1 3/2007 Fetting, Jr. et al.
2007/0062775 A1 3/2007 Bird
2007/0131509 A1 6/2007 Kimes
2008/0185253 A1 8/2008 Deaville et al.

* cited by examiner

CONTROLLABLE OVERRUNNING COUPLING ASSEMBLY

CROSS-REFERENCE TO RELATED APPLICATION

This application claims the benefit of U.S. provisional patent application Ser. No. 61/066,620 entitled "MD-Rocker Hybrid Controllable One-Way Clutch" and filed Feb. 21, 2008.

BACKGROUND OF THE INVENTION

1. Field of the Invention

This invention relates to controllable overrunning coupling assemblies especially for use in vehicular automatic transmissions.

2. Background Art

A typical one-way clutch consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

FIG. 1 illustrates a prior art mechanical diode (i.e., MD) clutch controllable with a slide plate in a transmission. The clutch replaces a L/R friction pack and functions as a one-way clutch (OWC) and as a backing plate. The automatic transmission gear system includes a planetary gearing arrangement 10, which comprises three simple planetary gear units 12, 14 and 16. Gear unit 12 includes a sun gear 18, a ring gear 20, and a planetary carrier 22. Gear unit 14 comprises a sun gear 24, a ring gear 26, and a planetary carrier 28. Gear unit 16 comprises a sun gear 30, a ring gear 32, and a planetary carrier 34.

Carrier 28 is drivably connected to gear 32, as shown at 36. Carrier 22 is drivably connected to ring gear 26, as shown at 38. Ring gear 20 is drivably connected to planetary carrier 34 by a torque transfer member 40.

A torque input shaft, which corresponds to the turbine shaft of a hydrokinetic torque converter (not shown), is designated by reference numeral 42. It is splined to sun gear 24. Torque output sleeve shaft 44 is splined to carrier 34, and carrier 22 is splined to friction clutch element 46 of a multiple disc clutch assembly 48, which is engaged during operation of the transmission in the fourth, fifth and sixth speed ratios.

Clutch plates register with clutch discs of the clutch assembly 48. Clutch plates are connected to clutch member 50, which defines in part spaced annular clutch cylinders, as shown at 52 and 54. An annular piston 56 is disposed in clutch cylinder 52 and an annular piston 58 is disposed in annular cylinder 54. The pistons 56 and 58 are biased to a clutch release position by clutch return springs 60 and 62, respectively. The cylinder 52 and the piston 56 define a pressure chamber, which, when pressurized causes piston 56 to frictionally engage the clutch plates and clutch discs of the multiple disc clutch assembly 48 to establish a driving connection between carrier 22 and clutch element 50.

Internally splined clutch plates of a multiple disc clutch assembly 64 are splined to the clutch element 50. Externally splined clutch plates of multiple disc clutch assembly 64 are drivably connected to sun gear 18 by clutch element 66.

Clutch element 66 is connected drivably to friction brake discs 68, which register with friction plates 70 of a multiple disc brake assembly 72.

Clutch disc assembly 64 is engaged during operation in the third and fifth speed ratios, as well as in reverse drive. Brake disc assembly 72 is engaged during operation in second ratio and sixth ratio.

The stationary transmission housing 74 rotatably supports turbine shaft 42, as shown at 76. Housing 74 defines an annular brake pressure chamber 78 in which is situated annular piston 80. A brake actuator element 82 carried by the piston 80 is engageable with the brake disc assembly 72 to establish a torque reaction point for sun gear 18.

Sun gear 16 is drivably connected to brake disc assembly 84 by means of torque transfer element 86. Housing 74 defines an annular cylinder 88, which receives annular piston 90.

A planar clutch assembly of the prior art is illustrated in FIG. 1 at 92. The assembly 92 comprises a notch plate 94, which envelopes pocket plate 96. A planar annular surface 98 of the assembly 92 provides a brake disc reaction surface, which is engaged by an adjacent brake disc of the brake disc assembly 84. Clutch plates of the brake disc assembly 84 are externally splined to the transmission housing 74.

The surface 98 on the notch plate 94 is fully precision ground prior to assembly so that it can act as a backing plate for the friction disc pack. It thus is not necessary with the design illustrated in FIG. 1 to provide a separate backup plate for the friction brake assembly. The integrated design illustrated in FIG. 1 incorporates common features for the planar clutch assembly 92 and the friction brake assembly 84, thereby eliminating components and reducing the packaging space for the torque transmitting elements of the transmission.

The brake disc assembly 84 is frictionally engaged when pressure is applied by the piston 90, which actuates pressure plate 102 of the brake disc assembly 84.

The notch plate 94 acts as the reaction element for the brake disc assembly 84. It is splined to the transmission housing 74 and is secured within the transmission housing against axial displacement by snap ring 106 located in a snap ring groove in the transmission housing 74.

The pocket plate 96 is held fast within the notch plate 94 by a snap ring 104 situated in a snap ring groove formed in the pocket plate 96. An annular thrust plate 107 is located axially along the rotational axis between the pocket plate 96 and the snap ring 104. The thrust plate 107 has a first axial face that contacts the snap ring 104 and has a second axial face oriented in the opposite axial direction as the first axial face and contacting only the pocket plate 96 without contacting the notch plate 94. Furthermore, the thrust plate 107 has a retainer (not shown) projecting therefrom to prevent rotation of the thrust plate. Pocket plate 96 has an axial extension 116 which has splines 108 to establish a splined driving connection to carrier 22. The integral design illustrated in FIG. 1 also eliminates a L/R friction pack or multiple disc brake assembly which includes friction brake discs that would normally be splined to the extension 116.

The planar one-way clutch assembly 92 also includes (as shown, for example, in U.S. Pat. Nos. 7,258,214 and 7,344,010 and published U.S. patent application 2007/0056825)

forward and reverse sets of pawls or keys (not shown) and a planar control number or plate 109 which is rotatable between facing surfaces of the pocket plate 96 and the notch plate 94 by means of a slide plate fork 111 to move the pawls or keys between notch-engaging and notch-disengaged positions.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them, one plate being connected to the driving member and the other plate being connected to the driven member, each plate having strut recesses, a series of struts located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,290,044 discloses a selectable one-way clutch assembly for use in an automatic transmission comprising a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The catching ends of the struts are cammed in the pockets by ramped camming ends of the teeth when the strut plate assembly is rotated in the opposing direction, thereby allowing freewheeling of the strut plate in the overrun direction.

U.S. Pat. No. 7,258,214 discloses an overrunning coupling assembly and a method of controlling the engagement of planar first and second members wherein two sets of opposed engaging struts are applied with one motion of a single control plate or member. The planar first and second members have inside surfaces extending generally normal to a first axis. The assembly includes free-floating, forward keys and free-floating, reverse keys opposed to the forward keys. The forward and reverse keys are movable between a notch-engaging, engaged position and a disengaged position in which the second member is permitted to free-wheel relative to the first member. The planar control member is disposed between the first and second surfaces and is controllably rotatable about the first axis between first and second angular positions relative to the first member.

U.S. Pat. No. 7,344,010 discloses an overrunning coupling assembly and a method of controlling the engagement of planar first and second members wherein the assembly includes clustered pawls and their respective pawl-holding portions. The planar first and second members have inside surfaces extending generally normal to a first axis. The pawls include a forward set of free-floating pawls and a reverse set of free-floating, clustered pawls. The forward and reverse sets of pawls are movable between a notch-engaging, engaged position and a disengaged position. Because of the clustering, a control element, disposed between the first and second surfaces, need not be fully circular and is controllably rotatable about the first axis between first and second angular positions relative to the first member.

Published patent application US 2006/0278487 discloses an overrunning radial coupling assembly or clutch and a method of controlling the engagement of inner and outer plates or members of the assembly wherein adjacent engaging radial locking pawls are selectively controlled by a single, rotatable control plate or element to obtain full lock, one-way lock and one-way overrun conditions. The assembly includes free-floating, forward pawls and free-floating, reverse pawls adjacent to their respective forward pawls. The forward and reverse pawls are movable between a notch-engaging, engaged position (i.e., full lock condition) and a disengaged position in which the outer member is permitted to free-wheel relative to the inner member in the one-way overrun condition in one direction about a first axis and the outer member is locked to the inner member in the one-way lock condition in the opposite direction. A number of different embodiments of the assembly and method are provided.

Other related U.S. patent publications include U.S. 2005/0279602; 2006/0021838; 2006/0185957; 2007/0062775; 2007/0056825; 2007/0131509 and 2008/0185253 and the following U.S. patents:

U.S. Pat. Nos. 7,455,157; 7,455,156; 7,451,862; 7,448,481; 7,383,930; 7,296,668; 7,223,198; 7,100,756; 6,854,577; RE 38,498; 6,571,926; 6,505,721; 6,481,551; 6,386,349; 6,333,112; 6,193,038; 6,186,299; 6,129,190; 6,125,980, 6,116,394; 6,065,576; 5,964,331; 5,918,715; and 5,871,071.

One problem associated with the prior art selectable or controllable one-way clutches, is that a control plate or element is used to contain or control both forward and reverse struts in a stationary pocket plate. Consequently, a relatively large quantity of lubricating fluid or oil is required to dampen the forward struts during overrun.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF THE INVENTION

An object of at least one embodiment of the present invention is to provide an improved controllable or selectable overrunning coupling assembly.

In carrying out the above object and other objects, a controllable coupling assembly is provided. The assembly includes first and second coupling members that are supported with respect to each other for relative rotation about a common rotational axis. The first and second coupling members have a first pair of annular coupling faces that oppose each other and are oriented to face axially along the rotational axis and a second pair of annular coupling faces that oppose each other and are oriented to face radially with respect to the rotational axis. A first coupling face of the first pair has a first set of pockets spaced about the rotational axis. Each pocket of the first set has a pivotal reverse strut received thereby. A first coupling face of the second pair has a second set of pockets spaced about the rotational axis. Each pocket of the second set has a pivotal forward rocker received thereby. A second coupling face of the second pair has a first set of locking formations that are engaged by the forward rockers upon projecting outwardly from the second set of pockets to prevent relative rotation of the coupling members with respect to each other in a first direction while permitting relative rotation of the coupling members with respect to each other in the opposite second direction by pivoting of the forward rockers in the second set of pockets. A second coupling face of the first pair has a second set of locking formations that are engaged by the reverse struts upon projecting outwardly from the first set of pockets to prevent relative rotation of the coupling members with respect to each other in the second direction while permitting relative rotation of the coupling members with respect to each other in the first direction by pivoting of the reverse struts in the first set of pockets. The assembly also includes a control member mounted for controlled, shifting movement between the first pair of coupling faces relative to the first set of pockets and operable for controlling position of only the reverse struts without controlling the position of the forward rockers. The control member allows at least one of the reverse struts to engage at least one of the second set of locking formations in a first position of the control member. The control member maintains the reverse struts in their pockets in a second position of the control member.

The first coupling member may include a housing having an end wall formed with the first set of pockets.

The second coupling member may include a splined ring having an outer circumferential surface formed with the second set of pockets.

The control member may include a slide plate controllably rotatable about the rotational axis between the first and second positions.

The assembly may further include a control element coupled to the control member and extending through a notch formed through the end wall to controllably shift the control member.

The first set of locking formations may include rocker cams.

One of the coupling members may have an annular groove and wherein the assembly further includes a generally round snap ring that is received by the annular groove in the one coupling member to retain the forward rockers in their respective pockets.

The second set of locking formations may include ramped reverse notches.

Further in carrying out the above object and other objects, a controllable clutch is provided. The clutch includes first and second clutch members that are supported with respect to each other for relative rotation about a common rotational axis. The first and second clutch members have a first pair of annular coupling faces that oppose each other and are oriented to face axially along the rotational axis and a second pair of annular coupling faces that oppose each other and are oriented to face radially with respect to the rotational axis. A first coupling face of the first pair has a first set of pockets spaced about the rotational axis. Each pocket of the first set having a pivotal reverse strut received thereby. A first coupling face of the second pair has a second set of pockets spaced about the rotational axis. Each pocket of the second set has a pivotal forward rocker received thereby. A second coupling face of the second pair has a first set of locking formations that are engaged by the forward rockers upon projecting outwardly from the second set of pockets to prevent relative rotation of the clutch members with respect to each other in a first direction while permitting relative rotation of the clutch members with respect to each other in the opposite second direction by pivoting of the forward rockers in the second set of pockets. A second coupling face of the first pair has a second set of locking formations that are engaged by the reverse struts upon projecting outwardly from the first set of pockets to prevent relative rotation of the clutch members with respect to each other in the second direction while permitting relative rotation of the clutch members with respect to each other in the first direction by pivoting of the reverse struts in the first set of pockets. The clutch further includes a control member mounted for controlled, shifting movement between the first pair of coupling faces relative to the first set of pockets and operable for controlling position of only the reverse struts without controlling the position of the forward rockers. The control member allows at least one of the reverse struts to engage at least one of the second set of locking formations in a first position of the control member. The control member maintains the reverse struts in their pockets in a second position of the control member.

Still further in carrying out the above object and other objects, a controllable clutch is provided. The clutch includes first and second clutch members that are supported with respect to each other for relative rotation about a common rotational axis. The first and second clutch members have a first pair of coupling faces that oppose each other and are oriented to face axially along the rotational axis and a second pair of annular coupling faces that oppose each other and are oriented to face radially with respect to the rotational axis. One of the clutch members has an annular groove. A first coupling face of the first pair has a first set of pockets spaced about the rotational axis. Each pocket of the first set has a pivotal reverse strut received thereby. Each pocket of the first set includes a spring that pivotally biases its strut outwardly therefrom for locking. A coupling face of the second pair has a second set of pockets spaced about the rotational axis. Each pocket of the second set has a pivotal forward rocker received thereby. Each pocket of the second set includes a spring that pivotally biases its rocker outwardly therefrom for locking. A second coupling face of the second pair has a first set of locking formations that are engaged by the forward rockers upon projecting outwardly from the second set of pockets to prevent relative rotation of the clutch members with respect to each other in a first direction while permitting relative rotation of the clutch members with respect to each other in the opposite second direction by pivoting of the forward rockers in the second set of pockets. A second coupling face of the first pair has a second set of locking formations that are engaged by the reverse struts upon projecting outwardly from the first set of pockets to prevent relative rotation of the clutch members with respect to each other in the second direction while permitting relative rotation of the clutch members with respect to each other in the first direction by pivoting of the reverse struts in the first set of pockets. The clutch further includes a control member mounted for controlled, shifting movement between the first pair of coupling faces relative to the first set of pockets and operable for controlling position of only the reverse struts without controlling the position of the forward rockers. The control member has at least one opening which extends completely therethrough to allow at least one of the reverse struts to extend therethrough to engage at least one of the second set of locking formations in a first position of the control member. The control member maintains the reverse struts in their pockets in a second position of the control member. The clutch still further includes a generally round snap ring that is received by the annular groove in the one clutch member to retain the forward rockers in their respective pockets.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
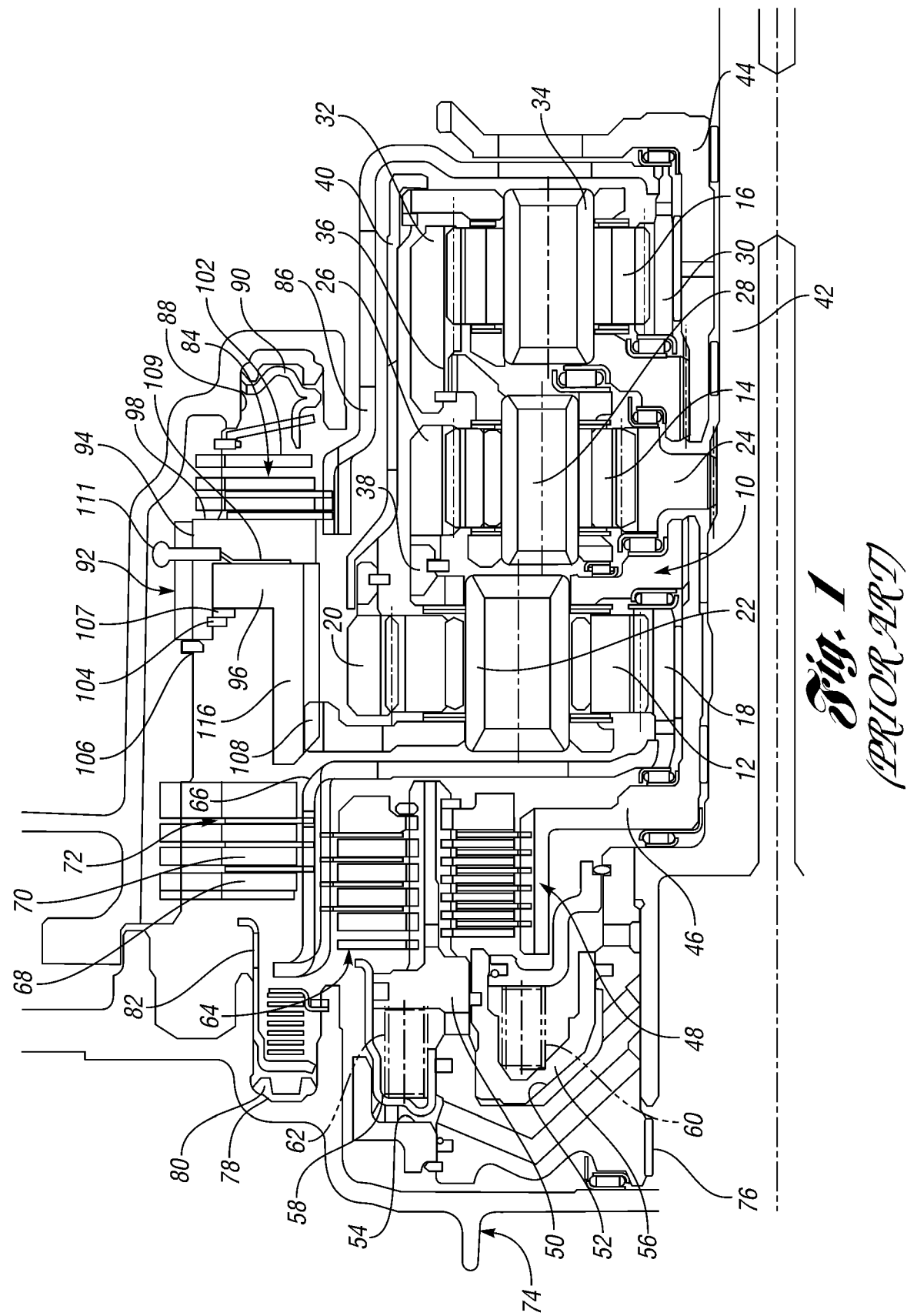
FIG. 1 is a partial cross-sectional side view of an upper half of a transmission that includes a controllable planar one-way clutch assembly constructed in accordance with the prior art and in combination with a friction clutch assembly.
Figure 2:
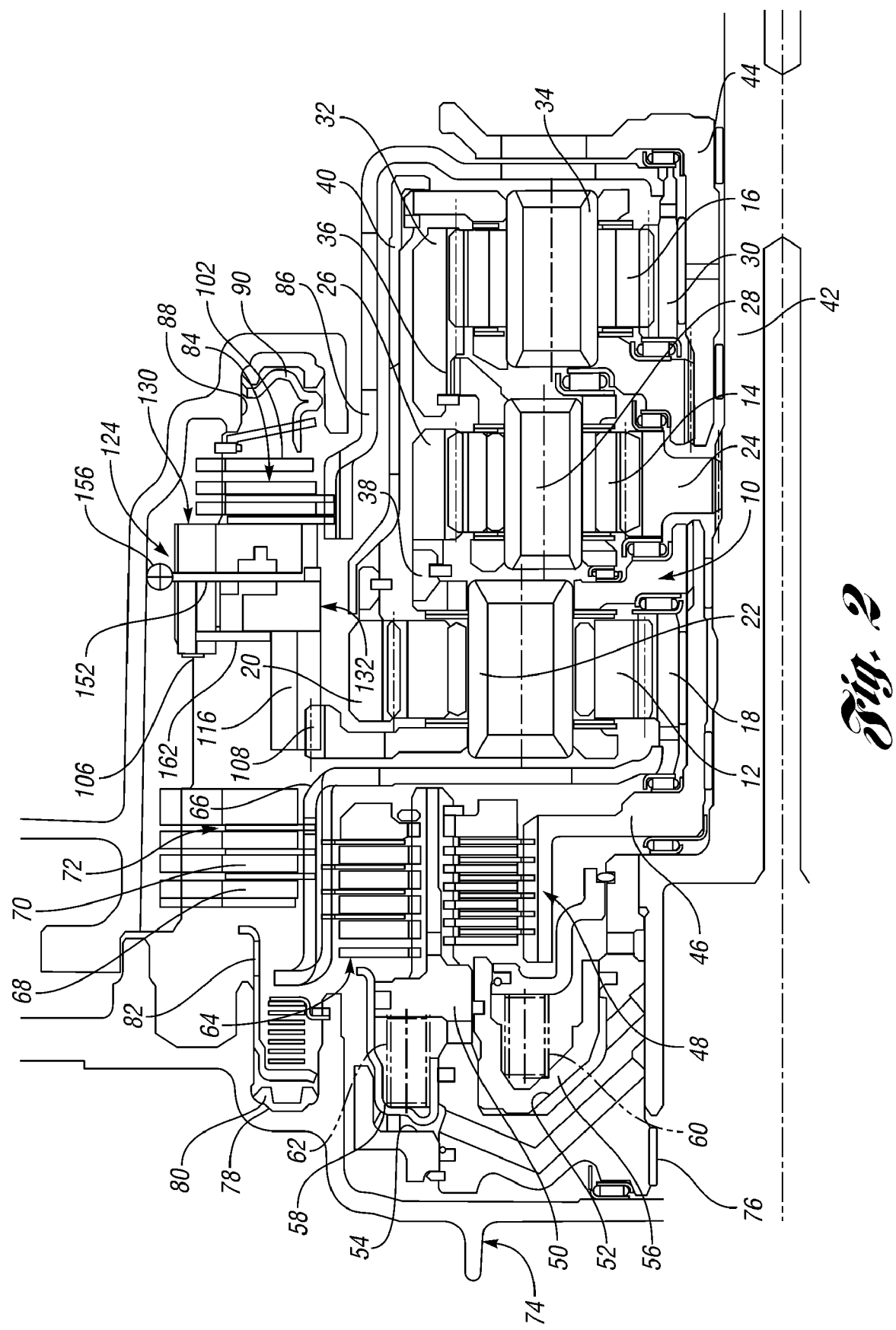
FIG. 2 is a view similar to the view of FIG. 1 but now illustrating a combined rocker and MD (i.e., mechanical diode) one-way clutch (i.e., hybrid design) constructed in accordance with one embodiment of the present invention; the controllable OWC of the present invention combines a rocker design for the forward OWC function and the MD with a slide plate for the reverse struts; the function of the clutch is the same as the MD controllables but uses the rocker design for the forward struts to help minimize the oil required to stabilize the struts.
Figure 3:
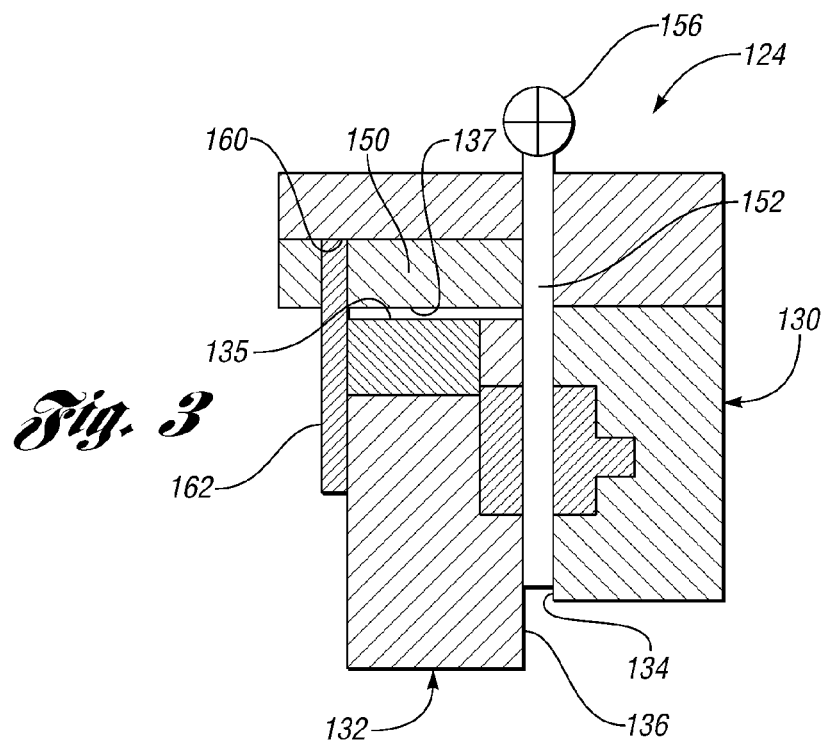
FIG. 3 is a schematic view illustrating the hybrid design of FIG. 2; the MD/rocker hybrid controllable OWC includes, as part of the rocker design, rocker cams, rocker pockets and spring biased rockers received in the pockets; the OWC also includes reverse notches, a reverse pocket plate, spring biased reverse struts received within reverse pockets and a slide plate to control the reverse struts.
Figure 4:
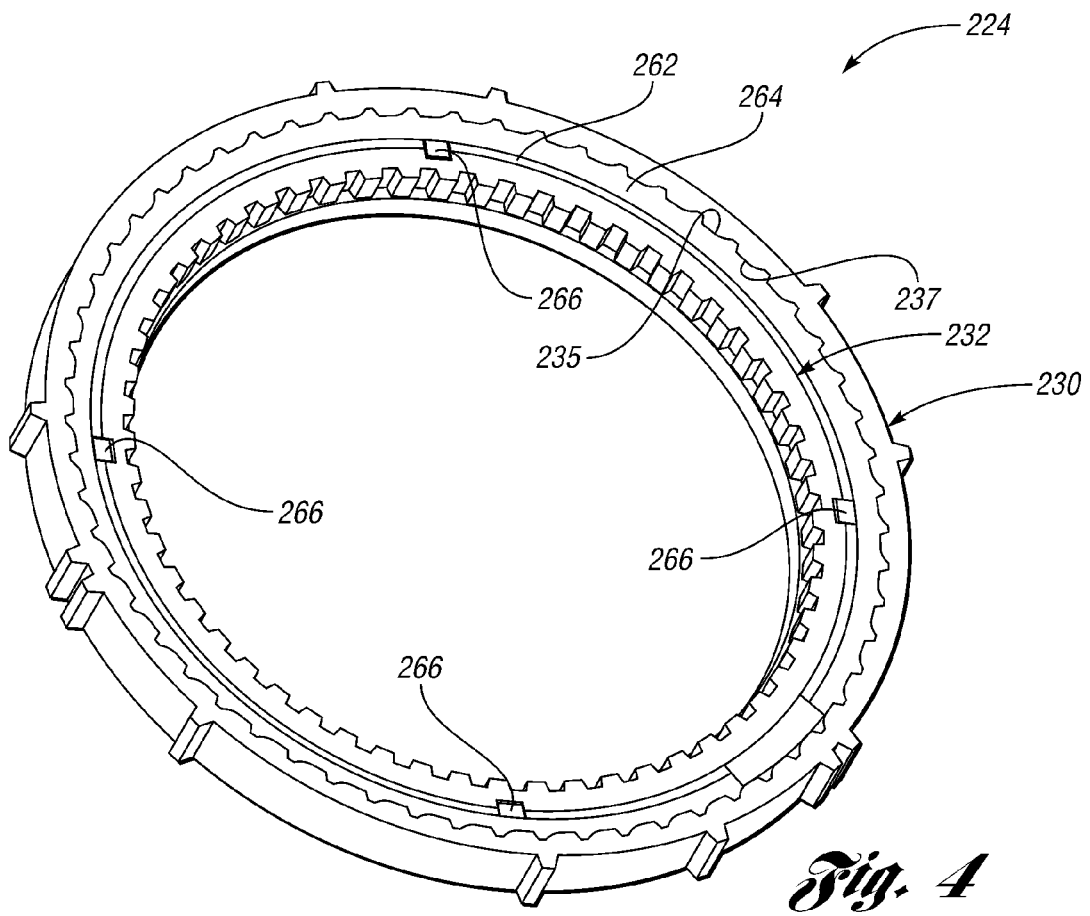
FIG. 4 is a perspective view of another embodiment of the hybrid design including a housing having strut pockets; an inner surface of the housing defines rocker cams; the design also includes a splined ring with rocker pockets and reverse notches and a first retainer ring; a second retainer ring extends between the housing and the splined ring to hold rockers (not shown) in place.

With reference to FIGS. 2 and 3, a controllable overrunning coupling or clutch assembly, generally indicated at 124, that is constructed in accordance with one embodiment of the present invention, replaces the prior art clutch assembly 92 in the transmission of FIG. 1. A second embodiment of an overrunning clutch or coupling assembly is generally indicated at 224 in FIG. 4. In general, parts of the second embodiment which are the same or similar in structure and/or function to the corresponding parts of the first embodiment have the same reference number but increased by 100.

The overrunning clutch 124 of the first embodiment includes first and second clutch members, generally indicated at 130 and 132 in FIGS. 2 and 3. In the second embodiment, the members are generally indicated at 230 and 232 in FIGS. 4-9. The members 130 and 132 (as well as the members 230 and 232) are supported with respect to each other for relative rotation about a common rotational axis. The first and second clutch members 130 and 132 have a first pair of respective coupling faces 134 and 136 which are shown as facing axially along the rotational axis. In like fashion, the first and second clutch members 230 and 232 have respective coupling faces 234 and 236.

The first and second clutch members 130 and 132 also have a second pair of respective coupling faces 135 and 137. In like fashion, the first and second clutch members 230 and 232 have respective coupling faces 235 and 237. The coupling faces 135 and 136 (as well as the coupling faces 235 and 237) are oriented to face radially with respect to the rotational axis.

The coupling face 134 of the clutch member 130 has pockets (not shown), spaced circumferentially about the rotational axis. Each pocket includes a pivotal reverse strut (not shown) received thereby, and each pocket also includes a spring (not shown) that pivotally biases its strut outwardly therefrom for locking while permitting movement back into the pocket to permit relative rotation between the clutch members 130 and 132. Exemplary reverse pockets, struts and springs are shown by numerous prior art patent documents noted in the Background portion of this application.

In like fashion, the coupling face 234 of the clutch member 230 has pockets 238 spaced circumferentially about the rotational axis. Each pocket 238 includes a pivotal strut 240 received thereby and each pocket 238 also includes a spring (not shown) that pivotally biases its strut 240 outwardly therefrom for locking while permitting movement back into the pocket 238 to permit relative motion between the clutch members 230 and 232.

The coupling face 136 of the second clutch member 132 has locking formations that are engaged by the reverse struts upon projecting outwardly from their pockets of the first clutch member 130 to prevent relative rotation of the clutch members 130 and 132 with respect to each other while permitting relative rotation of the clutch members 130 and 132 with respect to each other in the opposite direction, which is permitted by pivoting of the reverse struts into their pockets against the bias of their associated springs. It should be understood that the relative rotation can include rotation of both clutch members 130 and 132 or rotation of only one of the clutch members (either 130 or 132) while the other is held from rotation.

In like fashion, the coupling face 236 of the second clutch member 232 has locking formations 244 that are engaged by the struts 240 upon projecting outwardly from the pockets 238 of the first clutch member 230 to prevent relative rotation of the clutch members 230 and 232 with respect to each other in one direction while permitting relative rotation of the clutch members 230 and 232 with respect to each other in the opposite direction, which is permitted by pivoting of the struts 240 into the pockets 238 against the bias of their associated springs. It should be understood that the relative rotation can include rotation of both clutch members 230 and 232 or rotation of only one of the clutch members 230 and 232 while the other is held from rotation.

The coupling face (135 or 235) of the second clutch member (132 or 232) has a second set of pockets (not shown in FIGS. 2 and 3, 246 in FIGS. 8-9) spaced about the rotational axis. Each pocket of the second set has a pivotal forward rocker (not shown in the Figures) received thereby. Each forward pocket of the second set includes a spring (not shown in either embodiment) that pivotally biases its rocker outwardly therefrom for locking.

The coupling face (137 or 237) of the first clutch member (130 or 230) has a first set of locking formations (150 in FIG. 3, 250 in FIG. 5) that are engaged by the forward rockers upon projecting outwardly from their pockets of the second clutch member 132 or 232) to prevent relative rotation of the clutch members (130 and 132 or 230 and 232) with respect to each other in a first direction while permitting relative rotation of the clutch members (130 and 132 or 230 and 232) with respect to each other in the opposite second direction by pivoting of the forward rockers in their pockets of the second clutch members (132 or 232). Preferred rockers, second set of pockets, locking formation and springs are illustrated in U.S. Pat. Nos. 7,100,756; 7,223,198; 7,383,930; 7,448,481; 7,451,862; 7,455,156; and 7,455,157; and published U.S. patent applications 2006/00211838; 2006/0185957; 2007/0062775; 2007/0131509 and 2008/0185253.

Figure 5:
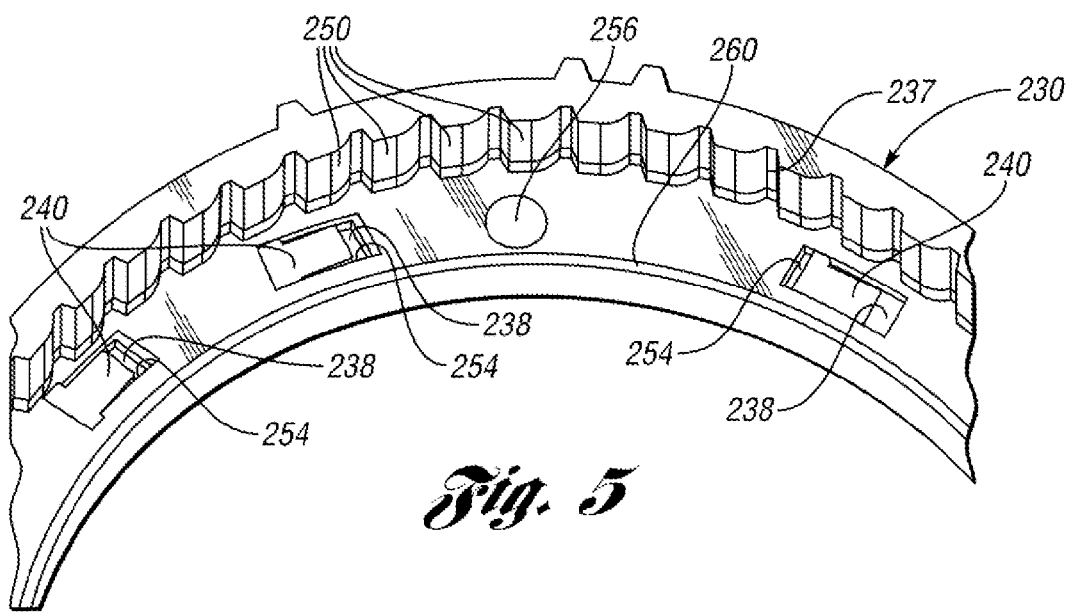
FIG. 5 is an enlarged view, partially broken away, and similar to the view of FIG. 4 with the splined ring and retainer rings removed to reveal reverse struts (biased by springs under the struts), rocker cams, a slide plate and one end of a control element to control the slide plate; the slide plate is apertured to control movement of the reverse struts; a control element is coupled to the slide plate and extends through a notch (shown in FIG. 7) formed through an end wall of the housing to controllably cover or uncover the struts.
Figure 6:
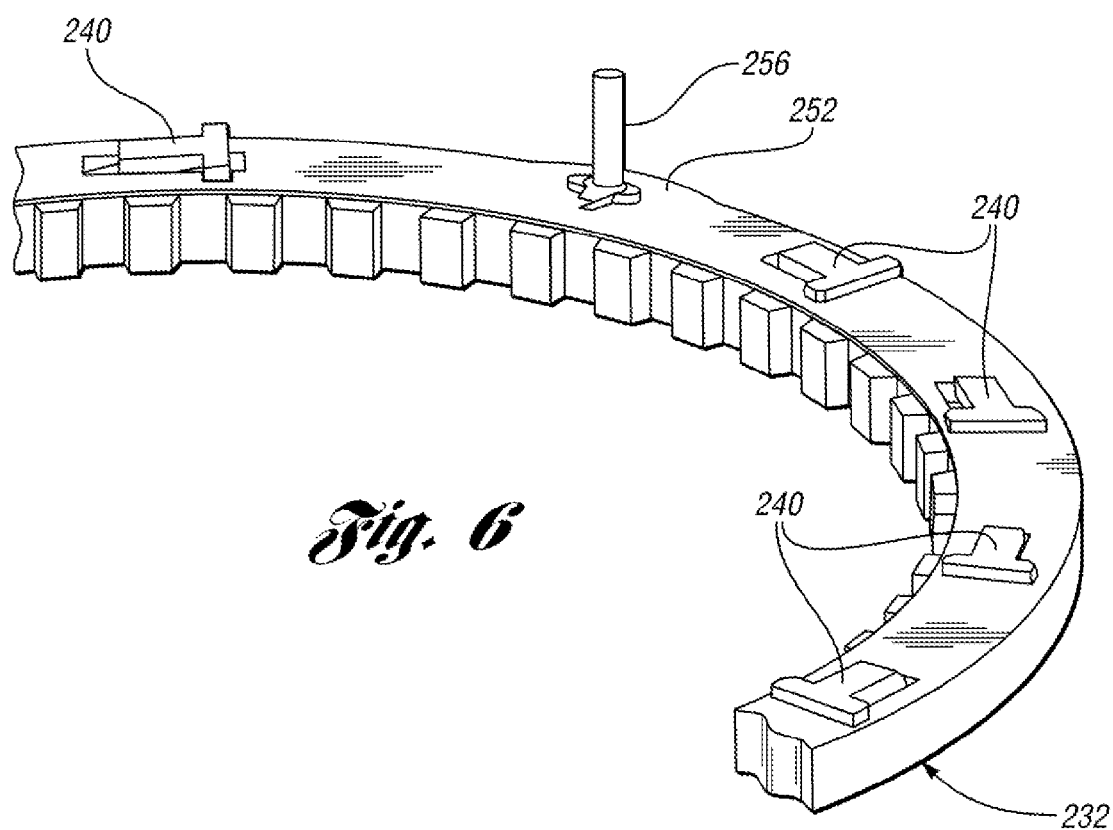
FIG. 6 is an enlarged perspective end view, partially broken away, of the splined ring, the biased reverse struts, the slide plate and the control element coupled to the slide plate; when uncovered by the slide plate, the biased reverse struts extend through apertures formed in the slide plate and engage the reverse notches formed in the splined ring.
Figure 7:
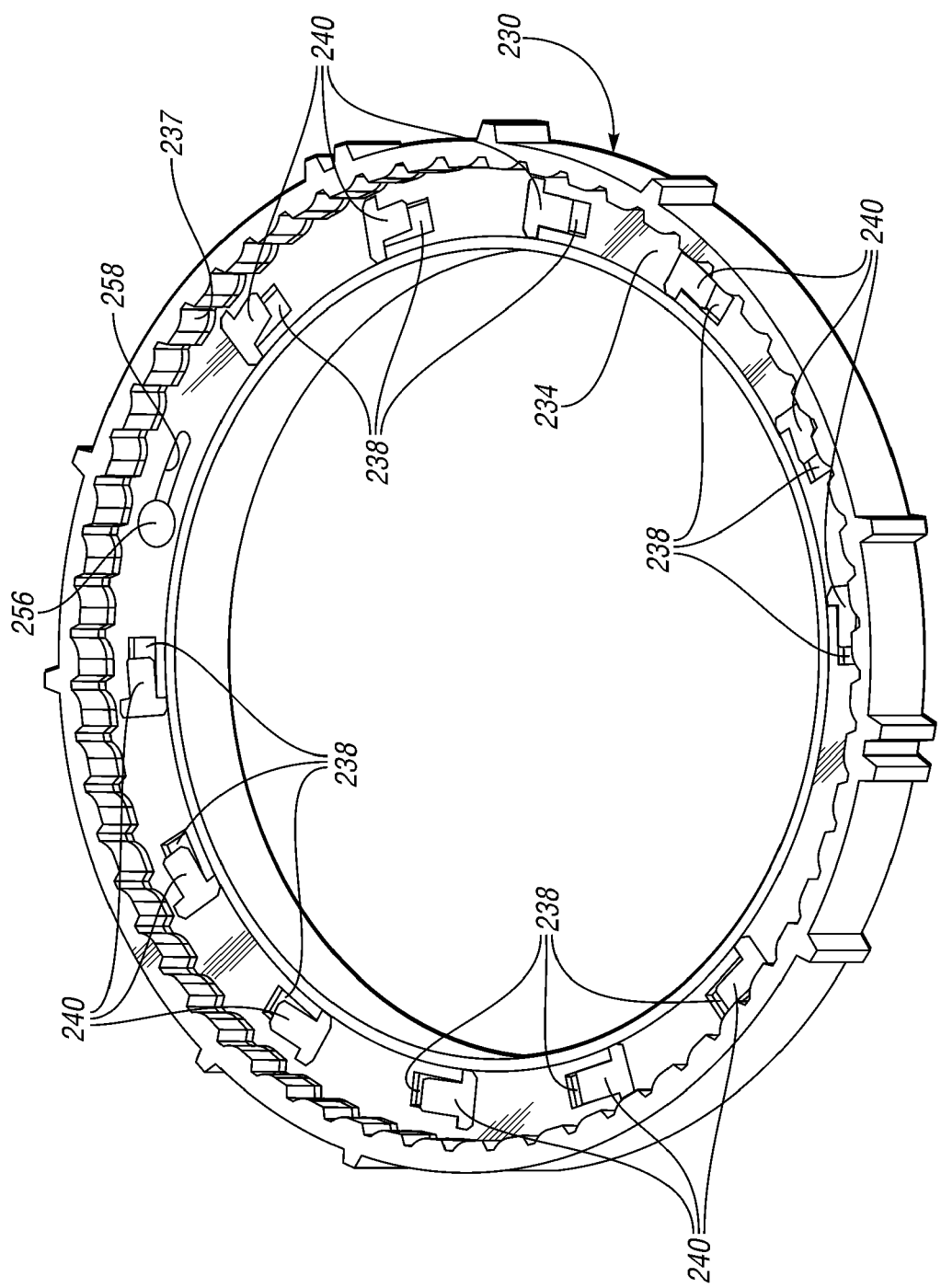
FIG. 7 is a view similar to the view of FIG. 5 but with the slide plate removed from the housing and uncoupled from one end of the control element; the biased reverse struts are housed within their respective pockets formed in an end wall of the housing.
Figure 8:
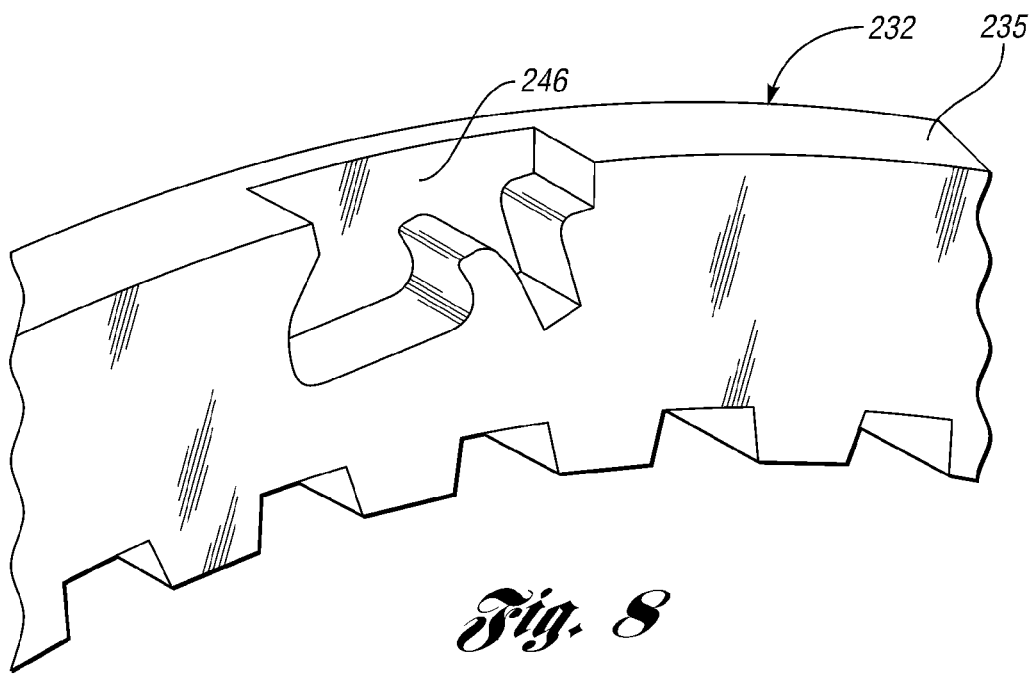
FIG. 8 is a perspective view, partially broken away, of one side of the splined ring with one of its rocker pockets formed in the outer circumferential surface of the splined ring; the rocker pockets receive rockers and biasing springs therein.
Figure 9:
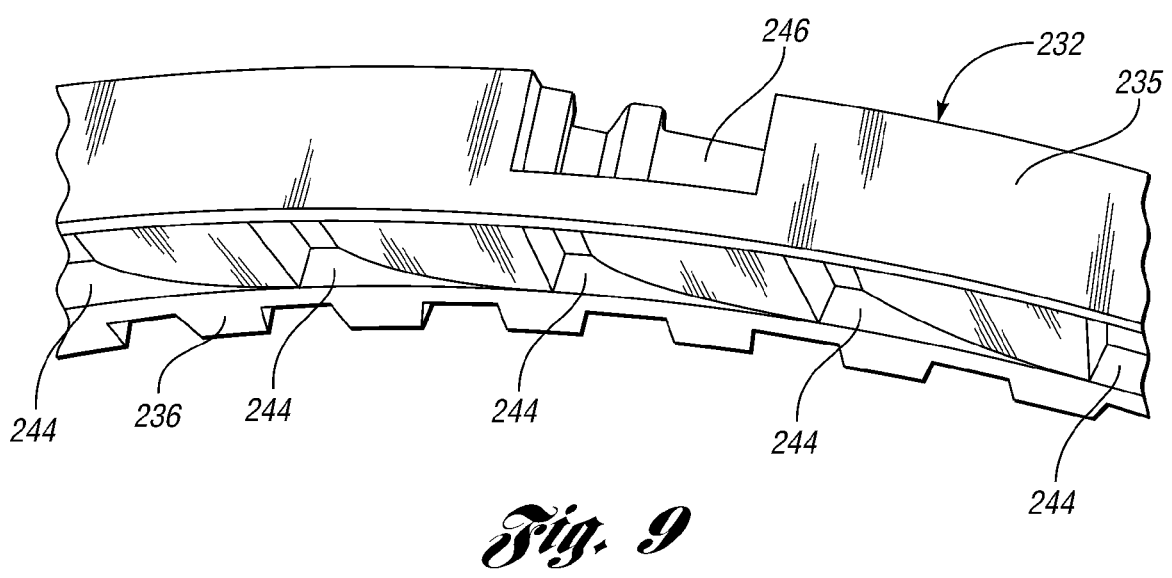
FIG. 9 is a perspective top view, partially broken away, of the opposite side of the splined ring of FIG. 8 with one of its rocker pockets and a plurality of reverse notches for the reverse struts.

A control member or plate, generally indicated at 152 in FIG. 3 and 252 in FIGS. 5 and 6, is mounted for controlled, shifting movement between the coupling faces (134 and 136 or 234 and 236) relative to the first set of reverse pockets and operable for controlling position of only the reverse struts without controlling the position of the forward rockers. The control member (152 or 252) has at least one opening (not shown in FIG. 2 or 3, 254 in FIG. 5 which extends completely therethrough to allow at least one of the reverse struts to extend therethrough to engage at least one of the second set of locking formations in a first position (as shown in FIGS. 5 and 6 for the second embodiment) of the control member (152 or 252). The control member (152 or 252) maintains the reverse struts (140 or 240) in their pockets (138 or 238) in a second position of the control member (152 or 252). The control member (152 or 252) is connected to an actuator arm or control element (156 in FIG. 3, 256 in FIGS. 5-7) which, in turn, is connected to a hydraulic valve or solenoid (not shown) to shift or rotate the control member (152 or 252) between its control positions. The actuator arm 256 extends through a slot 258 (i.e., FIG. 7) formed through the coupling face 234 at an end wall of the first coupling member 230.

The clutch member (130 or 230) has an annular groove (160 or 260) that receives a snap ring or retainer ring (162 or 262) of a generally annular shape. In the second embodiment, a second retainer ring 264 is located axially along the rotational axis between the clutch member 232 and the ring 262. The ring 264 has a first axial face that contacts the ring 262 and has a second axial face oriented in the opposite axial direction as the first axial face and contacting only the clutch member 232 without contacting the clutch member 230. Furthermore, the ring 262 has retainers 266 projecting therefrom to prevent rotation of the ring 264.

The retainer rings of the second embodiment are sheet metal stampings made from a metal such as steel, brass, aluminum or bronze. It is also possible to make the retainer rings as synthetic resin moldings.

Preferably, the member 130 or 230 and the member 132 or 232 can be formed using powder metal technology. During the sintering operation in the powder metal casting technique, the notches or formations can be formed readily when the member 132 or 232 still is in its heated state while it is most malleable.

The recesses or locking formations of one member 130 or 230 each include a ramped surface opposite the member's load-bearing shoulder. Each ramped surface includes a convex surface portion which engages the forward rockers during clutch overrun so as to urge the rockers into the non-coupling position.

In the exemplary clutch assembly, a quantity of lubricating fluid (not shown) is disposed between the members to impart additional stability to the forward rockers through fluid-damping, while further advantageously serving to reduce component wear. Significantly, however, the presence of convex surface portions and the attendant increase in rocker stability during clutch overrun permits use of a substantially reduced quantity of such lubricating fluid, when compared to known fluid-lubricated clutches. Such a reduction in the required quantity of lubricating fluid includes such potential correlative benefits, for example, as reduced fluidic drag on the member during clutch overrun, a reduced oil supply requirement, and less stringent requirements for peripheral oil seals. It will be appreciated, however, that it is contemplated to use any other suitable mechanism for reducing component wear, including manufacture of the forward rockers and the ramped surfaces of the member from a self-lubricating material.

In summary, by placing the forward rockers in the rotating member (132 or 232) and not the stationary member (130 or 230) centrifugal forces help "hold" the forward rockers in their pockets at high speeds. Also, the formations (150 or 250) with their ramps permit a hydrodynamic effect to cushion the forward rockers as they travel over the formations. In this way, overrun life is improved (with minimal oil) and spin loss is reduced due to less viscous drag.

Preferably, the notches for the MD are ramped, not square. There is some interruption in the notches where rocker pockets exist, unless that plate was thicker. The rockers are in the rotating member allowing for good backlash, good overrun stability, and quick laydown speeds during overrun. This design utilizes the least amount of powdered metal (i.e., PM) and maintains the most robust design.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A controllable coupling assembly comprising:
first and second coupling members that are supported with respect to each other for relative rotation about a common rotational axis, the first and second coupling members having a first pair of annular coupling faces that oppose each other and are oriented to face axially along the rotational axis and a second pair of annular coupling faces that oppose each other and are oriented to face radially with respect to the rotational axis;

a first coupling face of the first pair having a first set of pockets spaced about the rotational axis, each pocket of the first set having a pivotal reverse strut received thereby;

a first coupling face of the second pair having a second set of pockets spaced about the rotational axis, each pocket of the second set being sized and shaped to receive and allow pivoting movement of a pivotal forward rocker;

a second coupling face of the second pair having a first set of locking formations that are engaged by the forward rockers upon projecting outwardly from the second set of pockets to prevent relative rotation of the coupling members with respect to each other in a first direction while permitting relative rotation of the coupling members with respect to each other in the opposite second direction by pivoting of the forward rockers in the second set of pockets;

a second coupling face of the first pair having a second set of locking formations that are engaged by the reverse struts upon projecting outwardly from the first set of pockets to prevent relative rotation of the coupling members with respect to each other in the second direction while permitting relative rotation of the coupling members with respect to each other in the first direction by pivoting of the reverse struts in the first set of pockets; and a control member mounted for controlled, shifting movement between the first pair of coupling faces relative to the first set of pockets and operable for controlling position of only the reverse struts without controlling the position of the forward rockers, the control member allowing at least one of the reverse struts to engage at least one of the second set of locking formations in a first position of the control member and wherein the control member maintains the reverse struts in their pockets in a second position of the control member.

2. The assembly as claimed in claim 1, wherein the first coupling member comprising a housing having an end wall formed with the first set of pockets.

3. The assembly as claimed in claim 1, wherein the second coupling member comprises a splined ring having an outer circumferential surface formed with the second set of pockets.

4. The assembly as claimed in claim 1, wherein the control member comprises a slide plate controllably rotatable about the rotational axis between the first and second positions.

5. The assembly as claimed in claim 2, further comprising a control element coupled to the control member and extending through a notch formed through the end wall to controllably shift the control member.

6. The assembly as claimed in claim 1, wherein the first set of locking formations comprise rocker cams.

7. The assembly as claimed in claim 1, wherein one of the coupling members has an annular groove and wherein the assembly further comprises:

a generally round snap ring that is received by the annular groove in the one coupling member to retain the forward rockers in their respective pockets.

8. The assembly as claimed in claim 1, wherein the second set of locking formations comprise ramped reverse notches.

9. A controllable clutch comprising:

first and second clutch members that are supported with respect to each other for relative rotation about a common rotational axis, the first and second clutch members having a first pair of annular coupling faces that oppose each other and are oriented to face axially along the rotational axis and a second pair of annular coupling faces that oppose each other and are oriented to face radially with respect to the rotational axis;

a first coupling face of the first pair having a first set of pockets spaced about the rotational axis, each pocket of the first set having a pivotal reverse strut received thereby;

a first coupling face of the second pair having a second set of pockets spaced about the rotational axis, each pocket of the second set being sized and shaped to receive and allow pivotal movement of a pivotal forward rocker;

a second coupling face of the second pair having a first set of locking formations that are engaged by the forward rockers upon projecting outwardly from the second set of pockets to prevent relative rotation of the clutch members with respect to each other in a first direction while permitting relative rotation of the clutch members with respect to each other in the opposite second direction by pivoting of the forward rockers in the second set of pockets;

a second coupling face of the first pair having a second set of locking formations that are engaged by the reverse struts upon projecting outwardly from the first set of pockets to prevent relative rotation of the clutch members with respect to each other in the second direction while permitting relative rotation of the clutch members with respect to each other in the first direction by pivoting of the reverse struts in the first set of pockets; and a control member mounted for controlled, shifting movement between the first pair of coupling faces relative to the first set of pockets and operable for controlling position of only the reverse struts without controlling the position of the forward rockers, the control member allowing at least one of the reverse struts to engage at least one of the second set of locking formations in a first position of the control member and wherein the control member maintains the reverse struts in their pockets in a second position of the control member.

10. A controllable clutch comprising:

first and second clutch members that are supported with respect to each other for relative rotation about a common rotational axis, the first and second clutch members having a first pair of coupling faces that oppose each other and are oriented to face axially along the rotational axis and a second pair of annular coupling faces that oppose each other and are oriented to face radially with respect to the rotational axis and wherein one of the clutch members has an annular groove;

a first coupling face of the first pair having a first set of pockets spaced about the rotational axis, each pocket of the first set having a pivotal reverse strut received thereby, and each pocket of the first set being sized and shaped to receive a spring that pivotally biases its strut outwardly therefrom for locking;

a first coupling face of the second pair having a second set of pockets spaced about the rotational axis, each pocket of the second set being sized and shaped to receive and allow pivotal movement of a pivotal forward rocker, and each pocket of the second set being sized and shaped to receive a spring that pivotally biases its rocker outwardly therefrom for locking;

a second coupling face of the second pair having a first set of locking formations that are engaged by the forward rockers upon projecting outwardly from the second set of pockets to prevent relative rotation of the clutch members with respect to each other in a first direction while permitting relative rotation of the clutch members with respect to each other in the opposite second direction by pivoting of the forward rockers in the second set of pockets;

a second coupling face of the first pair having a second set of locking formations that are engaged by the reverse struts upon projecting outwardly from the first set of pockets to prevent relative rotation of the clutch members with respect to each other in the second direction while permitting relative rotation of the clutch members with respect to each other in the first direction by pivoting of the reverse struts in the first set of pockets;

a control member mounted for controlled, shifting movement between the first pair of coupling faces relative to the first set of pockets and operable for controlling position of only the reverse struts without controlling the position of the forward rockers, the control member having at least one opening which extends completely therethrough to allow at least one of the reverse struts to extend therethrough to engage at least one of the second set of locking formations in a first position of the control member and wherein the control member maintains the reverse struts in their pockets in a second position of the control member; and a generally round snap ring that is received by the annular groove in the one clutch member to retain the forward rockers in their respective pockets.

* * * * *